US011008644B2

(12) United States Patent
Dittli et al.

(10) Patent No.: US 11,008,644 B2
(45) Date of Patent: May 18, 2021

(54) LASER PATTERNING OF MULTI-LAYER STRUCTURES

(71) Applicant: nLIGHT, Inc., Vancouver, WA (US)

(72) Inventors: Adam Dittli, Vancouver, WA (US); Robert J. Martinsen, West Linn, OR (US)

(73) Assignee: nLIGHT, Inc., Vancouver, WA (US)

( * ) Notice: Subject to any disclaimer, the term of this patent is extended or adjusted under 35 U.S.C. 154(b) by 219 days.

(21) Appl. No.: 16/141,504

(22) Filed: Sep. 25, 2018

(65) Prior Publication Data

US 2019/0032181 A1   Jan. 31, 2019

Related U.S. Application Data

(63) Continuation of application No. 14/768,613, filed as application No. PCT/US2014/017841 on Feb. 21, 2014, now Pat. No. 10,100,393.

(60) Provisional application No. 61/767,420, filed on Feb. 21, 2013, provisional application No. 61/818,881, filed on May 2, 2013, provisional application No. 61/875,679, filed on Sep. 9, 2013.

(51) Int. Cl.
  *C22F 1/14*       (2006.01)
  *B82Y 40/00*     (2011.01)
(52) U.S. Cl.
  CPC ............... *C22F 1/14* (2013.01); *B82Y 40/00* (2013.01)
(58) Field of Classification Search
  None
  See application file for complete search history.

(56) References Cited

U.S. PATENT DOCUMENTS

| 3,388,461 A | 6/1968 | Lins |
| 4,713,518 A | 12/1987 | Yamazaki et al. |
| 4,863,538 A | 9/1989 | Deckard |
| 4,953,947 A | 9/1990 | Bhagavatula |
| 5,008,555 A | 4/1991 | Mundy |
| 5,082,349 A | 1/1992 | Cordova-Plaza et al. |

(Continued)

FOREIGN PATENT DOCUMENTS

| CN | 1217030 C | 8/2005 |
| CN | 1926460 | 3/2007 |

(Continued)

OTHER PUBLICATIONS

Decision of Rejection from the Korean Intellectual Property Office for related Application No. 10-2015-7025813, 6 pages, dated Nov. 29, 2018.

(Continued)

*Primary Examiner* — Xiaowei Su
(74) *Attorney, Agent, or Firm* — Klarquist Sparkman, LLP

(57) ABSTRACT

A method of non-ablatively laser patterning a multi-layer structure, the multi-layer structure including a substrate, a first layer disposed on the substrate, a second layer disposed on the first layer, and a third layer disposed on the second layer, the method including generating at least one laser pulse having laser parameters selected for non-ablatively changing the conductivity a selected portion of the third layer such that the selected portion becomes non-conductive, and directing the pulse to the multi-layer structure, wherein the conductivity of the first layer is not substantially changed by the pulse.

18 Claims, 3 Drawing Sheets

(56) References Cited

U.S. PATENT DOCUMENTS

| | | |
|---|---|---|
| 5,231,464 A | 7/1993 | Ichimura et al. |
| 5,237,150 A | 8/1993 | Karube |
| 5,252,991 A | 10/1993 | Storlie et al. |
| 5,509,597 A | 4/1996 | Laferriere |
| 5,523,543 A | 6/1996 | Hunter, Jr. et al. |
| 5,566,196 A | 10/1996 | Scifres |
| 5,642,198 A | 6/1997 | Long |
| 5,719,386 A | 2/1998 | Hsieh et al. |
| 5,841,465 A | 11/1998 | Fukunaga et al. |
| 5,932,119 A | 8/1999 | Kaplan et al. |
| 6,310,995 B1 | 10/2001 | Saini et al. |
| RE37,585 E | 3/2002 | Mourou et al. |
| 6,353,203 B1 | 3/2002 | Hokodate et al. |
| 6,362,004 B1 | 3/2002 | Noblett |
| 6,426,840 B1 | 7/2002 | Partanen et al. |
| 6,434,302 B1 | 8/2002 | Fidric et al. |
| 6,490,376 B1 | 12/2002 | Au et al. |
| 6,569,382 B1 | 5/2003 | Edman et al. |
| 6,577,314 B1 | 6/2003 | Yoshida et al. |
| 7,099,535 B2 | 8/2006 | Bhagavatula et al. |
| 7,151,788 B2 | 12/2006 | Imakado et al. |
| 7,218,440 B2 | 5/2007 | Green |
| 7,318,450 B2 | 1/2008 | Nobili |
| 7,349,123 B2 | 3/2008 | Clarke et al. |
| 7,622,710 B2 | 11/2009 | Gluckstad |
| 7,628,865 B2 | 12/2009 | Singh |
| 7,781,778 B2 | 8/2010 | Moon et al. |
| 8,071,912 B2 | 12/2011 | Costin, Sr. et al. |
| 8,237,788 B2 | 8/2012 | Cooper et al. |
| 8,251,475 B2 | 8/2012 | Murray et al. |
| 8,269,108 B2 | 9/2012 | Kunishi et al. |
| 8,288,679 B2 | 10/2012 | Unrath |
| 8,310,009 B2 | 11/2012 | Saran et al. |
| 8,404,998 B2 | 3/2013 | Unrath et al. |
| 8,414,264 B2 | 4/2013 | Bolms et al. |
| 8,415,613 B2 | 4/2013 | Heyn et al. |
| 8,442,303 B2 | 5/2013 | Cheng et al. |
| 8,472,099 B2 | 6/2013 | Fujino et al. |
| 8,809,734 B2 | 8/2014 | Cordingley et al. |
| 9,496,683 B1 | 11/2016 | Kanskar |
| 9,537,042 B2 | 1/2017 | Dittli et al. |
| 2001/0050364 A1 | 12/2001 | Tanaka et al. |
| 2002/0147394 A1 | 10/2002 | Ellingsen |
| 2003/0174387 A1 | 9/2003 | Eggleton et al. |
| 2003/0213998 A1 | 11/2003 | Hsu et al. |
| 2004/0031779 A1 | 2/2004 | Cahill et al. |
| 2004/0112634 A1 | 6/2004 | Tanaka et al. |
| 2004/0126059 A1 | 7/2004 | Bhagavatula et al. |
| 2004/0207936 A1 | 10/2004 | Yamamoto et al. |
| 2005/0168847 A1 | 8/2005 | Sasaki |
| 2005/0191017 A1 | 9/2005 | Croteau et al. |
| 2005/0233557 A1 | 10/2005 | Tanaka et al. |
| 2006/0275705 A1 | 12/2006 | Dorogy et al. |
| 2007/0026676 A1 | 2/2007 | Li et al. |
| 2007/0041083 A1 | 2/2007 | Di Teodoro et al. |
| 2007/0075060 A1 | 4/2007 | Shedlov et al. |
| 2007/0251543 A1 | 11/2007 | Singh |
| 2008/0154249 A1 | 6/2008 | Cao |
| 2008/0231939 A1 | 9/2008 | Gluckstad |
| 2008/0246024 A1 | 10/2008 | Touwslager et al. |
| 2009/0052849 A1 | 2/2009 | Lee et al. |
| 2009/0080472 A1 | 3/2009 | Yao et al. |
| 2009/0122377 A1 | 5/2009 | Wagner |
| 2009/0274833 A1 | 11/2009 | Li |
| 2009/0297140 A1 | 12/2009 | Heismann et al. |
| 2009/0314752 A1 | 12/2009 | Manens et al. |
| 2009/0324233 A1 | 12/2009 | Samartsev et al. |
| 2010/0025387 A1 | 2/2010 | Arai et al. |
| 2010/0116794 A1 | 5/2010 | Taido et al. |
| 2010/0225974 A1 | 9/2010 | Sandstrom |
| 2010/0230665 A1 | 9/2010 | Verschuren et al. |
| 2010/0251437 A1 | 9/2010 | Heyn et al. |
| 2010/0252543 A1 | 10/2010 | Manens et al. |
| 2010/0257641 A1 | 10/2010 | Perkins et al. |
| 2011/0080476 A1 | 4/2011 | Dinauer et al. |
| 2011/0127697 A1 | 6/2011 | Milne |
| 2011/0133365 A1 | 6/2011 | Ushimaru et al. |
| 2011/0187025 A1 | 8/2011 | Costin, Sr. |
| 2011/0243161 A1 | 10/2011 | Tucker et al. |
| 2011/0253668 A1* | 10/2011 | Winoto ............... H05K 3/06 216/13 |
| 2011/0278277 A1 | 11/2011 | Stork Genannt Wersborg |
| 2011/0279826 A1 | 11/2011 | Miura et al. |
| 2011/0316029 A1 | 12/2011 | Maruyama et al. |
| 2012/0127097 A1 | 5/2012 | Gaynor et al. |
| 2012/0128294 A1 | 5/2012 | Voss et al. |
| 2012/0145685 A1 | 6/2012 | Ream et al. |
| 2012/0148823 A1 | 6/2012 | Chu |
| 2012/0156458 A1 | 6/2012 | Chu |
| 2012/0295071 A1 | 11/2012 | Sato |
| 2012/0301733 A1 | 11/2012 | Eckert et al. |
| 2012/0301737 A1 | 11/2012 | Labelle et al. |
| 2013/0005139 A1* | 1/2013 | Krasnov ............... G06F 3/044 438/652 |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0095260 A1 | 4/2013 | Bovatsek et al. |
| 2013/0134637 A1 | 5/2013 | Wiesner et al. |
| 2013/0228442 A1 | 9/2013 | Mohaptatra et al. |
| 2013/0299468 A1 | 11/2013 | Unrath et al. |
| 2014/0104618 A1 | 4/2014 | Potsaid et al. |
| 2014/0155873 A1 | 6/2014 | Bor |
| 2014/0259589 A1 | 9/2014 | Xu et al. |
| 2014/0263209 A1 | 9/2014 | Burris et al. |
| 2014/0271328 A1 | 9/2014 | Burris et al. |
| 2014/0319381 A1 | 10/2014 | Gross |
| 2014/0332254 A1* | 11/2014 | Pellerite ............... B23K 26/362 174/251 |
| 2014/0333931 A1 | 11/2014 | Lu et al. |
| 2015/0165556 A1 | 6/2015 | Jones et al. |
| 2015/0270089 A1 | 9/2015 | Ghanea-Hercock |
| 2015/0314612 A1 | 11/2015 | Balasini et al. |
| 2015/0352664 A1 | 12/2015 | Errico et al. |
| 2016/0059354 A1 | 3/2016 | Sercel et al. |
| 2016/0114431 A1 | 4/2016 | Cheverton et al. |
| 2016/0158889 A1 | 6/2016 | Carter et al. |
| 2016/0187646 A1 | 6/2016 | Ehrmann |
| 2016/0294150 A1 | 10/2016 | Johnson |
| 2017/0120537 A1 | 5/2017 | DeMuth et al. |

FOREIGN PATENT DOCUMENTS

| | | |
|---|---|---|
| CN | 1966224 | 5/2007 |
| CN | 101836309 | 10/2007 |
| CN | 101143405 | 3/2008 |
| CN | 101303269 | 11/2008 |
| CN | 101314196 | 12/2008 |
| CN | 102448623 | 3/2009 |
| CN | 101733561 | 6/2010 |
| CN | 201783759 | 4/2011 |
| CN | 102084282 | 6/2011 |
| CN | 102176104 | 9/2011 |
| CN | 102207618 | 10/2011 |
| CN | 102301200 | 12/2011 |
| CN | 102441740 | 5/2012 |
| CN | 102549377 | 7/2012 |
| CN | 102582274 | 7/2019 |
| DE | 203 20 269 | 4/2004 |
| DE | 202016004237 | 8/2016 |
| EP | 2587564 | 5/2013 |
| EP | 2642246 | 9/2013 |
| JP | H02220314 | 9/1990 |
| JP | 2006-106227 | 4/2006 |
| JP | 2008-281395 | 11/2008 |
| KR | 10-2011-0109957 | 10/2011 |
| RU | 2008742 | 2/1994 |
| RU | 2021881 | 10/1994 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |
| WO | WO 1995/011100 | 4/1995 |

(56) References Cited

FOREIGN PATENT DOCUMENTS

| WO | WO 1995/011101 | 4/1995 |
|---|---|---|
| WO | WO 2011/146407 | 11/2011 |
| WO | WO 2012/102655 | 8/2012 |

OTHER PUBLICATIONS

Affine Transformation—from Wolfram MathWorld, http://mathworld.wolfram.com/AffineTransformation.html, downloaded Feb. 21, 2014, 2 pages.
Chung, "Solution-Processed Flexible Transparent Conductors Composed of Silver Nanowire Networks Embedded in Indium Tin Oxide Nanoparticle Matrices," Nano Research, 10 pages (Sep. 24, 2012).
First Office Action from Chinese Application No. 201410455972.X, dated Jan. 26, 2016, 21 pages (with English translation).
First Office Action from Chinese Application No. 201480019324.8, dated Apr. 5, 2017, 20 pages (with English translation).
Gardner, "Precision Photolithography on Flexible Substrates," http://azorescorp.com/downloads/Articles/AZORESFlexSubstrate.pdf (prior to Jan. 30, 2013).
Giannini et al., "Anticipating, measuring, and minimizing MEMS mirror scan error to improve laser scanning microscopy's speed and accuracy," PLOS ONE, 14 pages (Oct. 3, 2017).
Grigoriyants et al., "Tekhnologicheskie protsessy lazernoy obrabotki," Moscow, izdatelstvo MGTU im. N.E. Baumana, p. 334 (2006).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion for International Application No. PCT/US2018/026110, 12 pages, dated Aug. 8, 2018.
Java—Transform a triangle to another triangle—Stack Overflow, http://stackoverflow.com/questions/1114257/transform-a-triangle-to-another-triangle?1q=1, downloaded Feb. 21, 2014, 3 pages.
Kummer et al., "Method to quantify accuracy of position feedback signals of a three-dimensional two-photon laser-scanning microscope," Biomedical Optics Express, 6(10):3678-3693 (Sep. 1, 2015).
Notice of Preliminary Rejection from the Korean Intellectual Property Office for related Application No. 10-2015-7025813, dated Jun. 26, 2018, 18 pages.
Office Action for related Korea Application No. 10-2014-0120247, dated Oct. 18, 2017, 6 pages (with English translation).
Official Letter and Search Report from the Taiwan Intellectual Property Office for related Application No. 102139285, 21 pages, dated Jun. 13, 2016 (w/ English translation.).
Official Letter and Search Report from the Taiwan Intellectual Property Office for related Application No. 103106020, 21 pages, dated Apr. 20, 2016 (w/ Eng. translation.).
Official Letter and Search Report from the Taiwan Intellectual Property Office for related Application No. 102139285, 8 pages, dated Nov. 21, 2016 (w/ Eng. translation.).
Official Letter and Search Report from Taiwan Application No. 103130968, dated Dec. 20, 2016, 16 pages (w/ Eng. translation).
Official Letter and Search Report from Taiwan Application No. 103106020, dated Jun. 6, 2017, 7 pages (with English translation).
Official Action (w/English translation) for related Taiwan application No. 103130968 dated Jun. 7, 2017, 5 pages.
Office Action (no English translation) for related Chinese Application No. 201480022179.9, 5 pages, dated Mar. 30, 2017.
Office Action (w/ English translation) for related Chinese Application No. 201380075745.8, 21 pages, dated Jun. 2, 2017.
Office Action (w/ Eng. translation) for related Korea Application No. 10-2014-0120247, dated Apr. 14, 2017, 11 pages.
PCI-6110, Multifunction I/O Device, http.//www.ni.com/en-us-support/model.pci-6110.html, downloaded Dec. 15, 2017, 1 page.
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Search Report from the Taiwan Intellectual Property Office for related Application No. 102139285, dated Sep. 1, 2015 (w/ Eng. translation.).
Search Report from the Taiwan Intellectual Property Office for related Application No. 102139285, 10 pages, dated Sep. 4, 2017 (w/ English translation).
Second Office Action from Chinese Application No. 201410455972.X, dated Nov. 22, 2016, 22 pages (w/ English translation).
Second Office Action from Chinese Application No. 201480019324.8, dated Nov. 16, 2017, 21 pages (with English translation).
Second Office Action from Chinese Application No. 201380075745.8, dated Feb. 26, 2018, 6 pages (with English translation).
Third Office Action from Chinese Application No. 201480019324.8, dated Apr. 13, 2018, 8 pages (with English translation).
Website describing 3-Axis Laser Scanning Systems at http://www.camtech.com/index.php?option=com_content&view=article&id=131&Itemid=181, 4 pages, accessed Dec. 31, 2014.

* cited by examiner

LASER PATTERNING OF MULTI-LAYER STRUCTURES

CROSS REFERENCE TO RELATED APPLICATIONS

This application is a continuation of U.S. patent application Ser. No. 14/768,613, filed Aug. 18, 2015, which is a U.S. National Stage of International Application No. PCT/US2014/017841, filed Feb. 21, 2014, which was published in English under PCT Article 21(2), which in turn claims the benefit of U.S. Provisional Application Nos. 61/767,420 filed Feb. 21, 2013, 61/818,881 filed May 2, 2013, and 61/875,679 filed Sep. 9, 2013, all of which are incorporated herein by reference in their entirety.

BACKGROUND OF THE INVENTION

1. Field of the Invention

Generally, the field of the present invention is laser patterning. More particularly, the present invention relates to methods for patterning multi-layer stackups of materials.

2. Background

Touch screens are gaining traction in the electronics industry due to the increasingly high demand for smartphones, tablet computers, and all-in-one computers. An industry objective has been to reduce the overall thickness of the device, so decreasing the touch sensor thickness is an integral part of obtaining thinner devices. One idea to reduce the sensor thickness is to use a single film. The single film is typically a layered composite structure that has more than one conductive film layers on the same substrate. The conductive layers are typically separated by a thin insulating material. Overall separation of the conductive layers is in the micron range. The small separation between layers has been problematic for patterning the layers, particularly as conventional laser techniques involve a large amount of heat for ablation of a selected layer which often introducing structural change to subsequent or adjacent layers. Accordingly, there remains a need for a laser patterning method that is at least capable of overcoming the attendant drawbacks of conventional techniques applied to multi-layer composites.

SUMMARY OF THE INVENTION

According to one aspect of the present invention, a method of laser patterning a multi-layer structure, the multi-layer structure including a substrate, a first layer disposed on the substrate, a second layer disposed on the first layer, and a third layer disposed on the second layer, the method includes generating at least one laser pulse having laser parameters selected for non-ablatively changing the conductivity a selected portion of the third layer such that the selected portion becomes non-conductive, and directing the pulse to the multi-layer structure, wherein the conductivity of the first layer is not substantially changed by the pulse.

In another aspect of the invention a method of forming a multi-layer stack-up structure, includes providing a substrate, depositing a first layer on the substrate, the first layer being conductive, laser patterning the first layer such that selected portions of the first layer become non-conductive, depositing a second layer on the first layer, the second layer being insulating, depositing a third layer on the second layer, the third layer being conductive, and non-ablatively laser patterning the third layer such that selected portions of the third layer become non-conductive without substantially changing the conductivity of the first layer.

The foregoing and other objects, features, and advantages will become more apparent from the following detailed description, which proceeds with reference to the accompanying figures.

DETAILED DESCRIPTION OF THE INVENTION

Figure 1A:
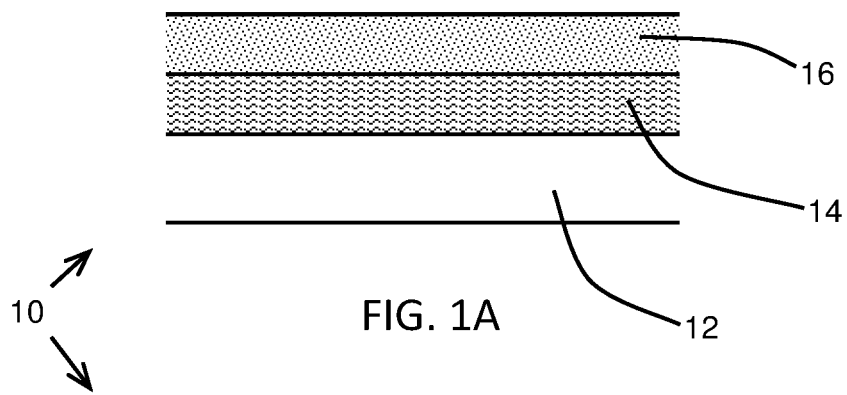
FIGS. 1A-1C show cross-sections of an exemplary stack-up structure at various steps in fabrication, in accordance with an aspect of the present invention.

In general, the processes and materials discussed herein can be useful in touch sensor fabrication and other applications for conductive substrates. Touch sensors typically comprise a film composite of various materials which become stacked together through one or more deposition or lamination processes. A variety of stack-up configurations is possible, and various intermediate processing steps can be implemented during the fabrication of the multiple layers. For example, different multi-layer structures described herein can have layers arranged in a different order than as disclosed in the drawings. In some embodiments, deposited material layers can be disposed on one or both sides of a substrate. In further embodiments, the pulsed laser beam can be incident from the opposite direction as shown. Different types of materials can be used for the different layers, the ones being discussed herein being some suitable examples. It will be appreciated that many different configurations and variations are possible that are within the scope of the present invention.

Figure 1B:
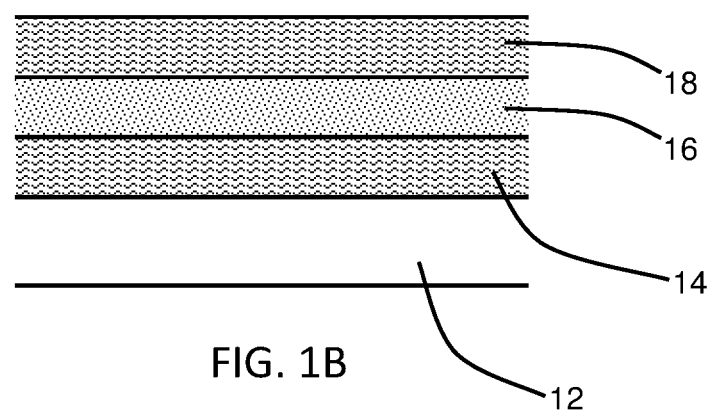
Figure 1C:
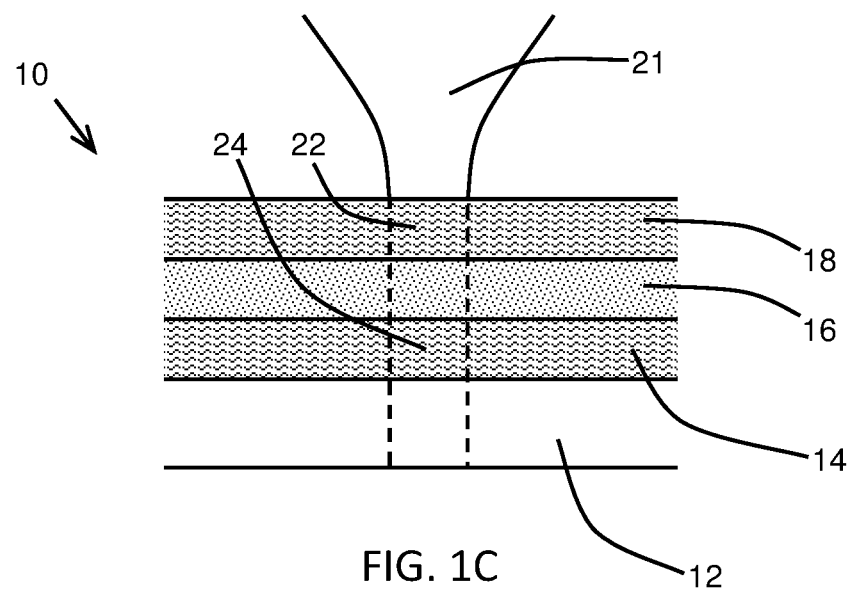

Reference is now made to FIGS. 1A-1C which depicts different stages for methods of non-ablative laser processing a multi-layer stack-up of materials, in accordance with aspects of the present invention. In FIG. 1A, a multi-layer stack-up structure 10 is provided which includes a substrate layer 12, made of PET or other suitable material. The structure 10 includes a conductive first layer 14 disposed on the substrate layer 12. The first layer 14 includes silver nanowires, or another suitable conductive material. A second layer 16, which may be made of photoresist or other suitable insulating material, is disposed on the first layer 14. Before the insulating layer 16 is deposited or formed on the first layer 14, the structure 10 can be laser processed non-ablatively to form selected non-conductive regions, including lines, patterns, or other geometries, the non-ablative processing being described further hereinafter.

The insulating layer 16 can include one or more dopants that increase the ability of the layer 16 to scatter or absorb incident laser energy so as to reduce the amount of residual fluence that is incident on the first layer 14. In FIG. 1B a third layer 18 is deposited or formed on the second layer 16 of the multi-layer structure 10. The third layer will typically include silver nanowires, though other suitable conductive materials can be used if capable of non-ablative conductivity alteration. One preferred layering is silver nanowires in both the first and third layers 14, 18. Silver nanowires offer several advantages over other materials, including the ability to be laser processed non-ablatively (as disclosed herein) and their ability to retain their characteristics under deformation, such as bending loads. For example, silver nanowires are well-suited for application in flexible touch screens. In FIG. 1C, a pulsed laser beam 21 is generated having process parameters suited for non-ablative alteration of the target. The pulsed laser beam 21 is directed to the structure 10 for laser processing of the structure 10. The pulsed beam 21 interacts with the third layer 18 of structure 10 without ablating a selected portion 22 of third layer 18. Through the interaction with the laser pulses from the pulsed laser beam 21 the conductivity of the selected portion 22 is changed to non-conductive. At the same time, a selected portion 24 of the first layer 14 that is below the third layer 18 does not experience the same change in conductivity. Additionally, the selected portion 24 is not ablated by the beam 21. The insulating layer 16 can assist in mitigating the pulse energy received by the first layer 14 in order to prevent a conductivity altering material interaction from occurring.

Figure 2A:
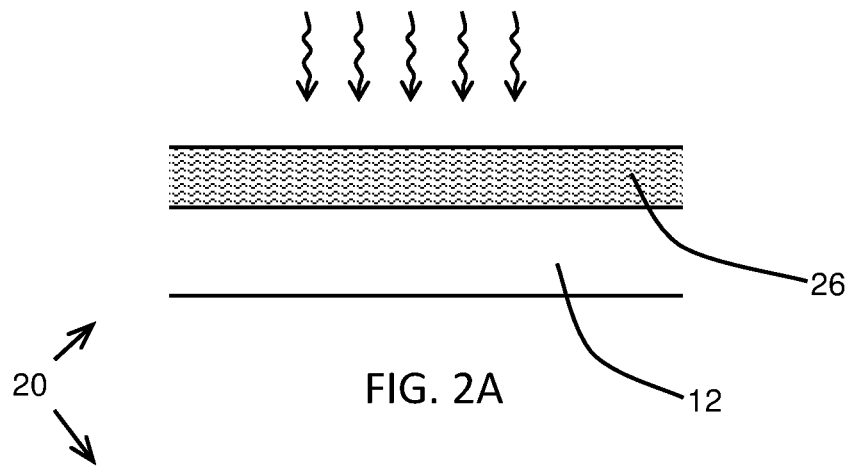
FIGS. 2A-2C show cross-sections of an exemplary stack-up structure at various steps in fabrication, in accordance with another aspect of the present invention.
Figure 2B:
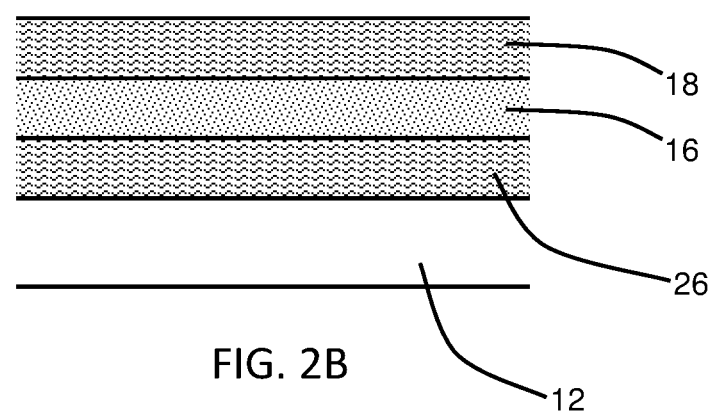
Figure 2C:
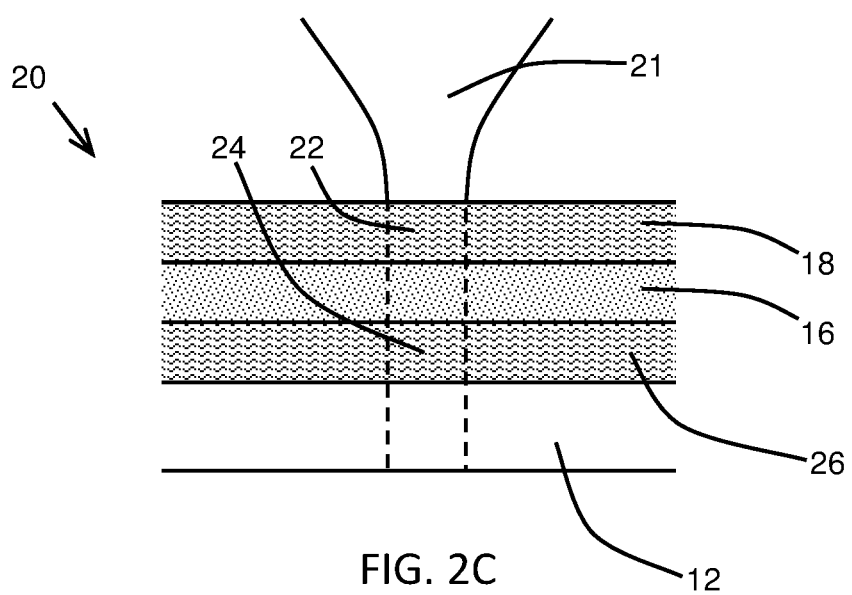

In FIGS. 2A-2C, another aspect is shown of a laser processing method of a multi-layer stack-up structure 20 in accordance with an aspect of the present invention. In FIG. 2A, a stack-up structure 20 includes a substrate 12 and a first layer 26, the first layer 26 preferably including silver nanowires. The first layer 26 is heat treated, represented by the downward facing arrows to alter upward a conductivity changing threshold characteristic of the first layer 26. Thus, after heat treatment, the threshold for alteration of the conductivity of the first layer 26 is higher. In some examples, this conductivity altering threshold can be related to an ablation threshold of the material. Various temperatures for heat treatment can be used and the temperature can be selected or adjusted to provide different effects to the first layer 26. In some examples heat treatment is performed with an oven, a laser, or other heat treating mechanism. The heat treatment of the first layer 26 can result in an alteration in density of an organic overcoat covering the silver nanowires in the first layer 26, increasing the fluence threshold thereof. In FIG. 2B, the structure 20 has undergone subsequent layering steps, providing second layer 16 on top of first layer 26, and a third layer 18 on top of second layer 16. In FIG. 2C, a pulsed laser beam 21 is generated having process parameters suited for non-ablative alteration of the target. The pulsed laser beam 21 is directed to the structure 20 for laser processing of the structure 20. The pulsed beam 21 interacts with the third layer 18 of structure 10 without ablating a selected portion 22 of third layer 18. Through the interaction with the laser pulses from the pulsed laser beam 21 the conductivity of the selected portion 22 is changed to non-conductive. At the same time, a selected portion 24 of the first layer 26 that is below the third layer 18 does not experience the same change in conductivity. Additionally, the selected portion 24 is not ablated by the beam 21.

Figure 3A:
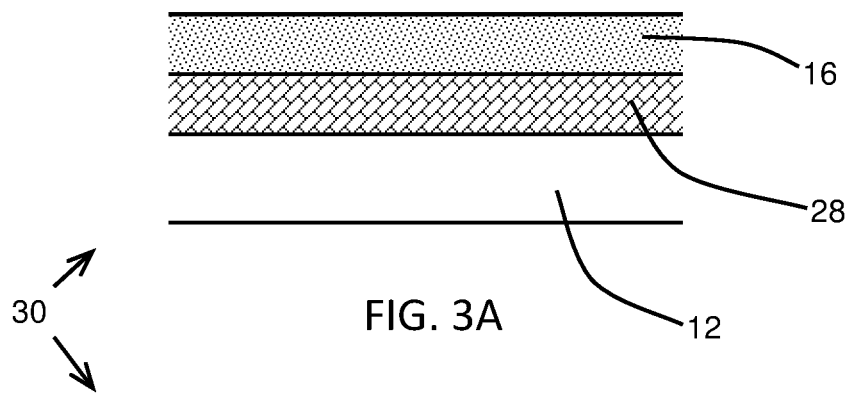
FIGS. 3A-3C show cross-sections of an exemplary stack-up structure at various steps in fabrication, in accordance with another aspect of the present invention.
Figure 3B:
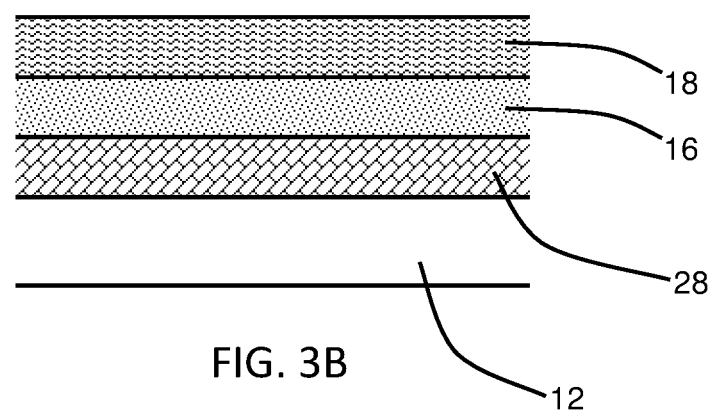
Figure 3C:
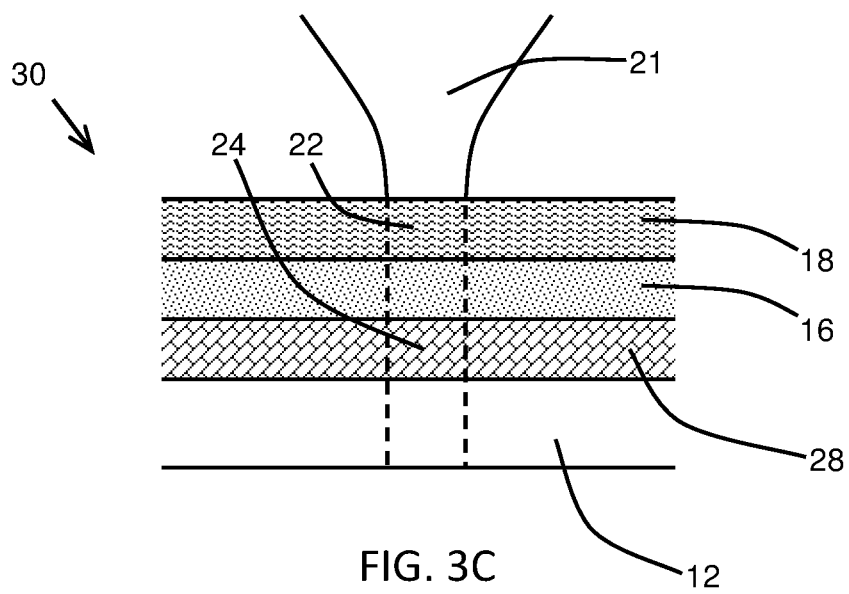

With reference to FIGS. 3A-3C, an aspect is shown of a laser processing method of a multi-layer stack-up structure 30 in accordance with an aspect of the present invention. In FIG. 3A, a stack-up structure 30 includes a substrate 12 and a first layer 28, the first layer 28 preferably including indium tin oxide. The first layer 28 can be processed ablatively such that portions of the first layer 28 are removed through an ablative laser process. A second layer 16 is deposited on the first layer 28. In FIG. 3B a third layer 28 is deposited or formed on the second layer 16. Third layer 28 is different from the material composition of the first layer 28, with third layer 28 preferably includes conductive silver nanowires. Because of the material difference, the third layer 18 has a conductivity changing threshold characteristic that is different from the first layer 28. The structure 30 is processed by a pulsed laser beam 21 in FIG. 2C. The pulsed laser beam 21 is generated having process parameters suited for non-ablative alteration of the target. The pulsed laser beam 21 is directed to the structure 30 for laser processing of the structure 30. The pulsed beam 21 interacts with the third layer 18 of structure 10 without ablating a selected portion 22 thereof. Through the interaction with the laser pulses from the pulsed laser beam 21 the conductivity of the selected portion 22 is changed to non-conductive. At the same time, a selected portion 24 of the first layer 28 that is below the third layer 18 does not experience the same change in conductivity. Additionally, the selected portion 24 is not ablated by the beam 21.

Conductive regions or layers are processed non-ablatively so they can be used in a touch-sensitive screen in electronic devices or in other devices related to printed electronics or optoelectronics, including devices benefitting from low damage, low visibility processing of substrates or where precision is required. As used herein, ablative processing is understood to mean substantial removal of material from a target caused by an incident optical beam by vaporization, photochemical alteration, or otherwise. Similarly, non-ablative processing is understood to mean that the structural features of the existing target surface topology remain intact after processing, even if electrical or other properties of the target are changed.

In some cases, the layers of conductive materials include a random arrangement of silver nanowires. The silver nanowires of such layers can be secured to a substrate in a polymer matrix, such as an organic overcoat. A laser beam can deliver laser pulses to such a layer and create a processed portion where the conductivity of the material of conductive layer is substantially changed such that the processed portion is effectively non-conducting. As used herein, the terms "conductive" and "nonconductive" have meanings attributed to them that are generally understood in the art of printed electronics, touch sensor patterning, or optoelectronics. For example, suitable sheet resistances for a material such that it may be considered conductive include 30-250 $\Omega$/sq, and suitable sheet resistances or electrical isolation measurements for a material such that the material may be considered non-conductive or electrically isolated include resistances greater than or equal to about 20 M$\Omega$/sq. However, these sheet resistances are merely examples, and other conductive and non-conductive ranges may apply depending on the requirements of the particular application. Some processed substrates may be considered sufficiently conductive with sheet resistances below 500 $\Omega$/sq, 1 k$\Omega$/sq, 5 k$\Omega$/sq, or 10 k$\Omega$/sq, and may be considered non-conductive with sheet resistances greater than or equal to about 100 k$\Omega$/sq, 1 M$\Omega$/sq, or 100 M$\Omega$/sq.

Laser pulses can be directed to the composite in various patterns such that particular regions and electrical pathways are formed on the substrate. By carefully selecting the characteristics of the laser pulse parameters, including pulse length, pulse fluence, pulse energy, spot size, pulse repetition rate, and scan speed, the substrate may be processed such that electrical characteristics thereof are altered in a predetermined way while the substrate and associated protective and conductive layers are not substantially damaged or structurally altered (e.g., ablatively).

Exemplary laser pulse parameters suitable for non-ablative processing of a conductive layer include a pulse length of about 50 ps, pulse fluence of about 0.17 J/cm$^2$, a spot size of about 40 μm (1/e²), a scan rate of about 1 m/s with a pulse-to-pulse overlap of greater than 90%, a total pulse energy of about 12 μJ, and a pulse repetition rate of about 100 kHz, using optical radiation having a wavelength of 1064 nm (which has been found to interact with the substrate and other materials to a lesser extent than light of shorter wavelengths). Various other parameters are also suitable. For example, pulse repetition rates can be increased to 1 MHz, to 10 MHz, or to greater than 10 MHz to increase processing speeds. Pulse length can be selected to be shorter or longer. Pulse fluence can be adjusted to ensure that the target is processed non-ablatively. Possible pulse lengths include less than about 1 ps, 100 ps, 200 ps, 500 ps, 800 ps, or 1 ns. Other parameters can similarly be varied and optimized accordingly. Laser parameters suitable for non-ablative laser processing can be selected based in part on the relevant properties of the materials selected to be processed. For example, varying thickness of the substrate, the conductive layer, etc., can affect how laser pulse heat is distributed or result in other time-dependent effects requiring mitigation.

While beams for processing are generally brought to a focus at the structure, other beam geometrical configurations and intensity distributions are possible, including an unfocused beam, line beams, square or rectangular beams, as well as beams with uniform, substantially uniform or pre-selected intensity profiles across one or more transverse axes. In some cases, a composite can be translated to help achieve geometrical features on its surface. In some cases, one or more laser beams impinge on a composite from either a top or back side direction so that the beam propagates through the substrate to the conductive layer such that the beam causes ablative or non-ablative changes to a conductive layer. In some cases, laser pulses cause a processed portion of a conductive layer to become non-conductive without changing the visible characteristics of the processed portion. Similarly, laser pulses can process a conductive border either ablatively or non-ablatively. Laser ablation of a conductive border can be achieved by increasing the energy content of the laser beam incident on the target surface. For example, the laser pulse parameters can be adjusted by increasing the pulse length, pulse fluence, total pulse energy, by using shorter wavelengths, or by decreasing the spot size. Suitable laser systems capable generally include pulsed fiber lasers, pulsed fiber amplifiers, and diode pumped solid-state lasers.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

We claim:

1. A multi-layer structure, comprising:
    a substrate;
    a first layer situated on the substrate and having a conductive first portion and a non-conductive second portion adjacent the conductive first portion;
    an insulating second layer situated on the first layer; and
    a silver nano-wire third layer situated on the insulating second layer and having a conductive first portion and a non-ablatively laser formed non-conductive second portion adjacent to the conductive first portion.

2. The multi-layer structure of claim 1, wherein the conductive first portion of the first layer has a higher laser pulse conductivity alteration threshold than the conductive first portion of the silver nano-wire third layer.

3. The multi-layer structure of claim 1, wherein the conductive first portion of the first layer is indium tin oxide (ITO) and the non-conductive second portion of the first layer is ablated ITO.

4. The multi-layer structure of claim 1, wherein the non-conductive second portion of the silver nano-wire third layer overlies the non-conductive second portion of the first layer.

5. The multi-layer structure of claim 1, wherein the first layer includes silver nanowires.

6. The multi-layer structure of claim 1, wherein the insulating second layer comprises photoresist.

7. The multi-layer structure of claim 1, wherein the insulating second layer is situated to protect the first layer from a change in conductivity during non-ablative laser processing of the third layer.

8. The multi-layer structure of claim 7, wherein the second layer is situated to scatter or absorb energy during the non-ablative laser processing of the third layer.

9. The multi-layer structure of claim 1, wherein the first layer comprises a heat-treated layer.

10. The multi-layer structure of claim 9, wherein the heat-treated layer has a higher laser pulse conductivity altering threshold, relative to a laser pulse conductivity altering threshold of the conductive first portion of the silver nano-wire third layer, based on the heat treatment.

11. The multi-layer structure of claim 1, wherein the substrate comprises a substrate layer of polyethylene terephthalate (PET).

12. A touch-sensitive screen, comprising the multi-layer structure of claim 1.

13. A touch-sensitive sensor, comprising the multi-layer structure of claim 1.

14. The multi-layer structure of claim 1, wherein conductive first portion of the silver nano-wire third layer has a sheet resistance from 30-250 Ω/sq.

15. The multi-layer structure of claim 1, wherein non-conductive second portion of the silver nano-wire third layer has a sheet resistance greater than or equal to about 20 MΩ/sq.

16. The multi-layer structure of claim 1, wherein the conductive first portion and non-conductive second portion of the silver nano-wire third layer have a same surface roughness.

17. The multi-layer structure of claim 1, wherein to an unaided eye of an observer the conductive first portion and non-conductive second portion of the silver nano-wire third layer are visibly indistinguishable from each other.

18. The multi-layer structure of claim 1, wherein the conductive matrix of silver nanowires includes an organic overcoat.

* * * * *